Patented June 25, 1940

2,205,488

UNITED STATES PATENT OFFICE 2,205,488

METHOD OF MAKING MOLDED ARTICLES

Albert W. Merrick, New York, N. Y., assignor to Austenal Laboratories, Inc., New York, N. Y., a corporation of New York No Drawing. Application July 8, 1938, Serial No. 218,105

8 Claims. (Cl. 18—47.5)

My present invention relates generally to the art of molding articles, and has particular reference to a new method of making molded articles of certain thermoplastic materials.

The present procedure is of particular utility in connection with the manufacture of dentures and similar products, although it will be understood that the invention is by no means restricted to this specific art, but may have far wider applicability to the molding of articles, generally.

The material of which a denture is made must embody certain important qualities. It should be of dense character, of adequate strength, it should be resistant to moisture, and it must be capable of accurately maintaining its unique shape and form under the elevated temperatures and stresses to which it may be subjected when in use. Additionally, it must be capable of being molded in the relatively frangible molds (composed of plaster or the like) which are necessarily employed because of the fact that a denture is a unique article of special shape and configuration, and the use of stronger molds (of metal or the like) is commercially unfeasible.

Among thermoplastic materials available for this general purpose, those which become moldably soft at relatively low temperatures are usually capable of being molded under relatively low pressures which do not injure the mold. But because of the tendency to soften at relatively low temperatures, dentures made of these materials are apt to lose their accurate shape when in use, through the phenomenon known as "cold flow."

There are certain thermoplastic materials which are less plastic at relatively low temperatures and which are also in other respects ideal for use in the manufacture of dentures or the like. However, they have such a low plasticity at molding temperature, that the required molding pressure is greater than the ordinary plaster mold can withstand without crushing or distortion. Among these thermoplastic materials are, for example, the acrylic resins.

It is a general object of my invention to provide an improved molding procedure whereby materials of this otherwise desirable character may be successfully utilized, in commercial practice, for the manufacture of dentures or other molded articles.

The ordinary use of plasticizers is not always satisfactory, because while this reduces the pressure required to fill the molds, it also lowers the temperature at which the body becomes plastic, thus affecting the stability of form and shape of the ultimate article through "cold flow." Moreover, plasticizers may decrease the moisture resistance, or lessen the strength of the material, or affect it adversely in other ways, such as loss by evaporation of the plasticizer, or oxidation, resulting in undesirable changes often referred to as "ageing."

The difficulty has heretofore been sought to be obviated by employing the thermoplastic material in powdered or granular form, whereby it may be packed around the porcelain teeth, and into the various convolutions of the mold, before the pressure is applied. However, the limited pressure that may be used renders this procedure unsatisfactory, because it is found that the material does not become sufficiently compacted to produce a dense homogeneous structure which will be non-absorbent, adequately strong, and of desirable appearance.

It has also been attempted to solve the problem by the employment of blanks, very roughly approximating the general shape of a denture, these blanks being preformed in stock molds of strong material and rugged construction capable of permitting the employment of relatively high pressures. However, the use of such blanks has not been satisfactory, because when one of these blanks is applied to the denture mold, the pressure required to force the material into and around the relatively fragile convolutions of the ordinary plaster mold, and between and around the relatively fragile porcelain teeth which may have been preliminarily positioned in the mold, is still extremely high and produces very severe and highly concentrated stresses. Moreover, all thermoplastic materials tend to recover their former shape when solid masses are changed in shape by another molding operation. This tendency, known as "elastic memory," induces the molded denture to return to the shape of the stock blank, and the stability of the denture is thus impaired.

In accordance with my present invention, these various difficulties are avoided by plasticizing the material temporarily at the time of its initial introduction into the mold, and eliminating the temporary plasticizer by the application of heat prior to the step of subjecting the material to a final molding pressure at molding temperature. The material is preferably used in comminuted form, either powdered or granular, and the temporary plasticizing agent is preferably a solvent or other material of sufficiently high volatility to permit its elimination at temperatures no higher than the ultimate molding temperature.

By means of my present invention, a temporarily plasticized charge may be pressed with great ease, and at room temperatures, into preliminary conformity with the mold, and where a two-piece mold is used it may be opened at any stage of this procedure to permit inspection, and to permit additional material to be added, or excess material to be withdrawn, depending upon requirements. This means that the operation can be comfortably and leisurely performed with accuracy and reliability of results.

Preferably, the preliminary pressing operation is performed with an excess charge of the temporarily plasticized material. Where a two piece mold is used, a preliminary molding is thus formed, which is in effect a "made to order" blank accurately conforming to the mold surfaces, but of excess thickness. After the elimination of the plasticizing agent, the procedure is completed by pressing the preliminary molding at molding temperature into final accurate conformity with the mold and to the desired thickness. During this final molding step, pressures may safely be used which would otherwise be disastrous to a relatively weak mold, for the reason that the material, even though of low plasticity, already occupies the various intricate and minute cavities and crevices of the mold, as well as the spaces around and between any teeth that may have been partially embedded in the plaster. The effect is analogous to that of hydraulic pressure which distributes itself evenly throughout the material in all directions, serving to impart a final shape and density to the mold charge. During this final pressure, at molding temperature, there is little or no actual flow of the material; the slightly over-thick preliminary molding is reduced to the desired thickness by the act of completely closing the parts of the mold, and the slight excess material is extruded from the periphery of the denture into waste channels provided in the mold at the juncture of its parts.

By the term "molding temperature" I intend to refer to a temperature which softens the thermoplastic material, but which is not too high to destroy or seriously alter the properties of the material.

This general procedure lends itself readily to various modifications of particular utility in the denture field. For example, if desired, one or more permanent conditioning ingredients may be conveniently incorporated with the material during its initial plasticizing. This ingredient may consist, for example, of a coloring ingredient. In this way, the color most suitable to the individual for whom the denture is intended can be obtained, the result being under the judgment and control of the operator, which has not been the case heretofore. On the other hand, the permanent conditioning ingredient may be some sort of filler such as ground porcelain or other hard mineral material. This could be admixed with the plastic mold charge for the purpose of imparting an additional hardness and greater resistance to abrasion to the resultant molded article. In certain cases, where a slight degree of ultimate yieldability might be desirable, a material such as rubber in a solvent could be made to combine homogeneously with the mold charge while the latter is in the temporarily plasticized state.

Wherever a permanent conditioning ingredient is used, it is preferably soluble in the liquid or solvent which is used as the temporary plasticizer, and the term "permanent" is intended to refer to the fact that the conditioning ingredient remains in the material notwithstanding the fact that the plasticizing liquid or solvent is subsequently eliminated.

This invention is obviously applicable to any thermoplastic material whose plasticity at molding temperature is so relatively low that ordinary molding procedures would require pressures too great for a relatively weak mold to withstand. The acrylic resins hereinbefore mentioned fall into this category, as do also the vinyl chlorides, the vinyl chlorides-acetate polymers, the polymeric compounds of acrylic acid, and other synthetics of similar character.

As a specific example of the materials and amounts that may be used in the case of a typical denture, 25 grams of methyl methacrylate, in the form of a coarse powder, are stirred into a sufficient quantity of a liquid solvent to produce a thick plastic mass in a few minutes.

For this amount of powder anywhere from 2 to 15 c.c. of solvent may be used, the plastic mass being thus variable, at will, from a thick relatively viscous condition to a thick pourable liquid.

A preferable solvent is one which consists of a highly volatile ingredient, such as acetone, and a less volatile ingredient, such as isobutyl-ketone. The former acts quickly to soften and dissolve the methacrylate, while the latter is slower in its solvent action and is carried into the methacrylate by the acetone. The proportions used may be approximately 5 parts of acetone and 1 part of ketone, but this can be varied without changing the desired results.

A temporarily plasticized mold charge, thus compounded, is then pressed into approximate preliminary conformity with the mold, care being taken that all minute crevices and convolutions are filled with the charge. This can be conveniently done by tamping the plastic material with a hand tool to apply local pressure. More material is then added and the other part of the mold is placed in position, and the whole is then placed in a press and pressure applied, this pressure being sufficiently low so as not to damage the mold. The mold can be opened and material either added or removed, until the optimum amount of charge is in position. The mold is then subjected to heat to eliminate the solvent. The more volatile acetone is quickly and easily eliminated, while the less volatile ketone is not entirely eliminated until the mold has been heated longer, by which time the material, restored to normal unplasticized state, begins to approach the thermoplastic range of temperature. This temperature will vary, depending upon the material used, but may be, by way of example, in the neighborhood of 300–350° F.

At the molding temperature, the material is then subjected to the final pressure treatment, and this pressure may, if desired, attain the relatively high magnitude of 4,000–5,000 pounds per square inch, notwithstanding the fact that this degree of pressure would ordinarily be more than the ordinary plaster mold could withstand. During this final pressure treatment the mold is preferably retained at the optimum temperature by means of hot platens, by a surrounding oven, or by immersion in a liquid medium such as a suitable oil.

Since the material has previously been shaped to conformity with the surfaces of the mold, it is not required to flow to any great extent, and usually the maximum pressure hereinbefore mentioned is not necessary to press the material to final thickness and into final dense accurate conformity with the mold.

The mold is preferably kept under pressure until it has cooled, either by removal of the heating source, or by the use of a cooling medium such as water, after which time the mold is opened and the finished molded article is removed.

The process is of particular utility where the molded article is intended to comprise adjacent regions of differing character. In such an event, successive charges of comminuted thermoplastic material, preferably powdered, are introduced into the mold in preliminarily plasticized condition, each charge having the particular character desired at that portion of the mold. The composite charge is then pressed into the mold and the process completed as hereinbefore illustratively set forth. This procedure is of especial advantage in the manufacture of artificial teeth. By variations in the successive charges of material, the shade, translucency, or color, can be varied from region to region, and local or general hardening of the composition may be effected. This is accomplished by adding a permanent conditioning ingredient to each charge at the time it is preliminarily plasticized, each conditioning ingredient serving to impart the desired character to that particular charge.

It will be understood that minor variations in the procedure may be resorted to, where desired. For example, the method may be adapted for use with a so-called injection process. In this process, the plastic mass resulting from the temporary plasticizing of the material is injected into the mold cavity, and the plasticizing agent is then eliminated by heating the mold. In the case of dentures, the temporarily plasticized material is injected into hot or cold porous molds, the plasticizing agent is then eliminated by heat, and the final density is obtained by the application of pressure at molding temperature, during and following the elimination of the relatively volatile plasticizing agent.

It will be also understood that solvents, other than those illustratively specified, may be used. For example, solvents such as the lower ketones and esters, mixtures of aromatic hydrocarbons with alcohols, and others well known per se, may be employed either singly or in combinations, depending upon requirements.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention and illustrated its use, what I claim as new and desire to secure by Letters Patent is:

1. In a method of molding, in a frangible mold, a thermoplastic material which has a relatively low plasticity at molding temperature, the steps which consist in mixing the material in comminuted form with a liquid to make a mold charge of relatively high plasticity, said liquid having sufficiently high volatility to be capable of elimination from the mold charge at a temperature no higher than the molding temperature, pressing said mold charge into preliminary conformity with the mold at approximately room temperature and with a pressure sufficiently low so as not to damage the mold, then eliminating the liquid by application of heat, and pressing the charge at molding temperature into final conformity with the mold.

2. The method steps set forth in claim 1, said liquid being a solvent for said material.

3. The method steps set forth in claim 1, said initial mixing being accompanied by the addition of a coloring ingredient.

4. The method steps set forth in claim 1, said initial mixing being accompanied by the addition of a filler.

5. The method steps set forth in claim 1, said initial mixing being accompanied by the addition of a coloring ingredient which is soluble in said liquid.

6. The method steps set forth in claim 1, said initial mixing being accompanied by the addition of a filler which is soluble in said liquid.

7. The method steps set forth in claim 1, said charge being introduced into the mold in successive portions at least one of which has had a selected coloring ingredient added thereto, whereby the resultant molded article may be caused to embody adjacent regions of predetermined differing coloration.

8. The method steps set forth in claim 1, said charge being introduced into the mold in successive portions at least one of which has had a selected filler added thereto, whereby the resultant molded article may be caused to embody adjacent regions of predetermined differing characteristics.

ALBERT W. MERRICK.